US006915134B2

United States Patent
Atkin et al.

(10) Patent No.: US 6,915,134 B2
(45) Date of Patent: Jul. 5, 2005

(54) SYSTEM AND METHOD OF AUTOMATIC TRANSLATION OF BROADCAST MESSAGES IN A WIRELESS COMMUNICATION NETWORK

(75) Inventors: Steven Edward Atkin, Austin, TX (US); David Martin Birk, Round Rock, TX (US); Stephen B. Boston, Cedar Park, TX (US); Amir Farrokh Sanjar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 10/401,333

(22) Filed: Mar. 27, 2003

(65) Prior Publication Data

US 2004/0192258 A1 Sep. 30, 2004

(51) Int. Cl.[7] .............................. H04Q 7/20; H04H 1/00; H04M 11/00
(52) U.S. Cl. ................. 455/456.3; 455/3.02; 455/404.2
(58) Field of Search .............................. 455/3.01, 3.06, 455/404.1, 404.2, 414.2, 414.4, 456.1, 456.3

(56) References Cited

U.S. PATENT DOCUMENTS

| | | | | |
|---|---|---|---|---|
| 5,635,918 A | * | 6/1997 | Tett ............................. 340/7.29 |
| 6,070,065 A | * | 5/2000 | Armbruster et al. ...... 455/404.2 |
| 6,201,974 B1 | * | 3/2001 | Lietsalmi et al. ............ 455/466 |
| 6,323,767 B1 | | 11/2001 | Gropper ..................... 340/534 |
| 6,369,720 B1 | | 4/2002 | Wilhelm ...................... 340/905 |
| 6,407,673 B1 | | 6/2002 | Lane .......................... 340/901 |
| 2002/0022498 A1 | | 2/2002 | Hokao ......................... 455/556 |
| 2002/0035467 A1 | | 3/2002 | Morimoto et al. ............. 704/9 |
| 2002/0105959 A1 | * | 8/2002 | Laurin ......................... 370/432 |
| 2002/0116172 A1 | | 8/2002 | Vargas ............................ 704/8 |
| 2002/0142783 A1 | | 10/2002 | Yoldi et al. .................. 455/456 |
| 2002/0161666 A1 | | 10/2002 | Fraki et al. .................... 705/26 |
| 2002/0169619 A1 | * | 11/2002 | Ishihara ....................... 704/275 |
| 2002/0177428 A1 | | 11/2002 | Menard et al. ............. 455/404 |
| 2004/0203615 A1 | * | 10/2004 | Qu et al. ................. 455/412.1 |

FOREIGN PATENT DOCUMENTS

| | | | | |
|---|---|---|---|---|
| JP | 2000261573 | 9/2000 | .......... H04M/11/04 |
| JP | 2002041844 | 2/2002 | .......... G06F/17/60 |
| WO | WO 01/26393 | 4/2001 | ............ H04Q/7/20 |

* cited by examiner

*Primary Examiner*—Benny Tieu
(74) *Attorney, Agent, or Firm*—Duke W. Yee; Leslie A. Van Leeuwan; Stephen J. Walder, Jr.

(57) ABSTRACT

A system and method for automatic translation of broadcast messages in a wireless communication system are provided. With the system and method when a wireless communication device enters a region of a wireless network, the wireless communication device registers with the wireless network by way of a base station and mobile switching center. The registration of the wireless communication device includes the creation of a database entry at the mobile switching center that identifies the wireless communication device and includes an indication of the origin, such as the country code, of the wireless communication device. Based on this indication of origin, a desired output language may be identified. This identified output language may then be used to identify prestored versions of a broadcast message that are in the output language or identify the mechanism for translating a broadcast message from an original language to the identified output language. In this way, the broadcast message is generated in a language that is most likely to be understood by a user of the wireless communication device.

20 Claims, 2 Drawing Sheets

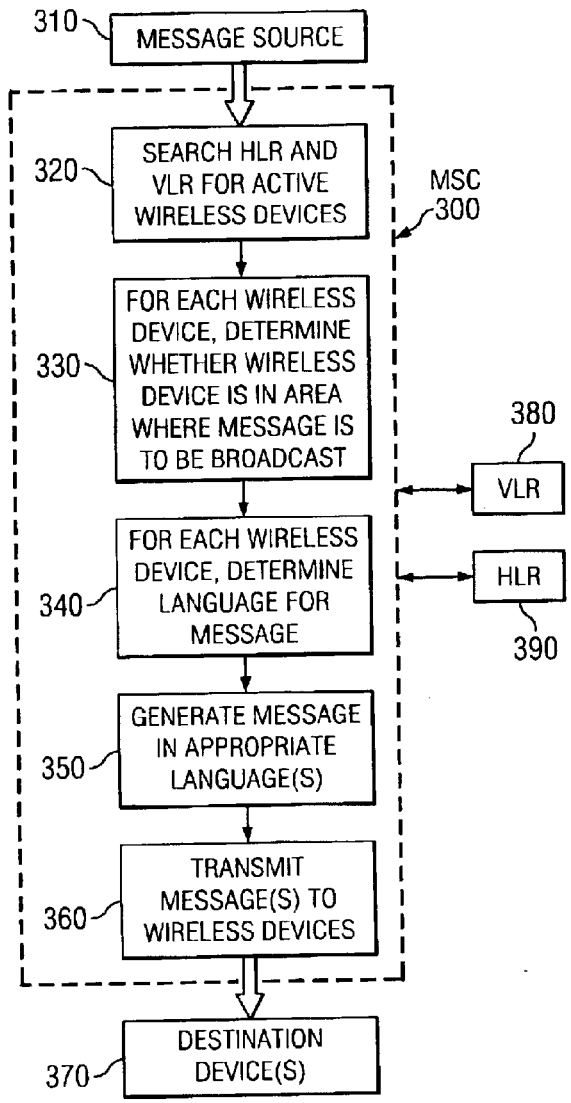
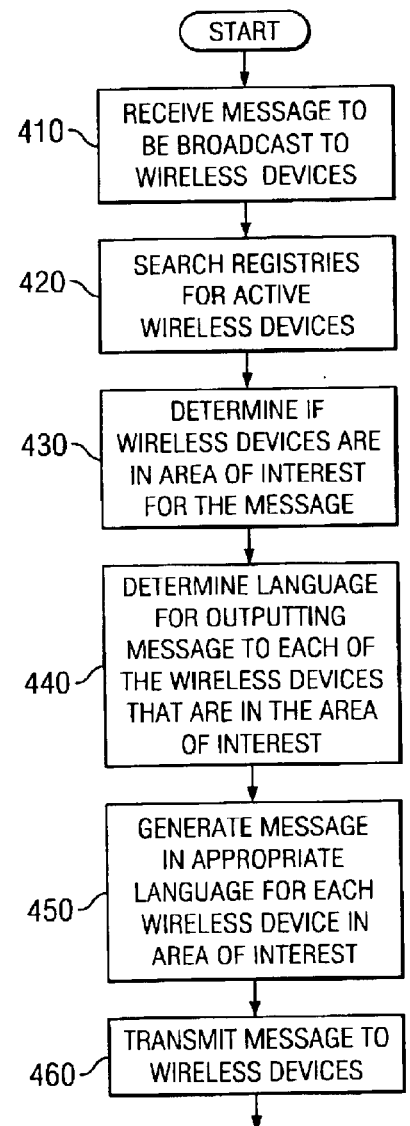
FIG. 3
FIG. 4

SYSTEM AND METHOD OF AUTOMATIC TRANSLATION OF BROADCAST MESSAGES IN A WIRELESS COMMUNICATION NETWORK

BACKGROUND OF THE INVENTION

1. Technical Field

The present invention is directed to a system and method for automatic translation of broadcast messages in a wireless communication network. More specifically, the present invention is directed to a mechanism for determining which wireless communication devices are in an area of interest where a message is to be broadcast and transmitting the message to the wireless communication devices in a language the is most likely to be understandable by the user of the wireless communication device.

2. Description of Related Art

The ability to travel large distances has allowed people of varying backgrounds, cultures, countries and the like, to visit areas that were previously inaccessible. Thus, it is very common to find people who speak different languages present in the same country either as tourists or as residents.

Traveling to foreign countries, such as on a vacation, for the most part is intended to be an enjoyable experience. Travelers are typically not expecting to be exposed to emergency conditions and are not on the lookout for emergency warnings when traveling abroad. Furthermore, lack of access to understandable emergency warning devices in a timely manner may result in casualties to foreign travelers.

For example, a traveler in an automobile may not be aware that they have just entered an area that is under a tornado watch. This may be due to the fact that the traveler does not have access to a device that is capable of outputting such a warning message. More likely, however, the traveler may not be aware of the imminent danger because the traveler is unable to understand warning messages that are broadcast because the traveler does not speak the language of the country he or she is visiting.

Therefore, there is a need for a system and method for automatically translating broadcast messages, such as warning messages. Moreover, there is a need for a system and method to transmit broadcast messages to people using communication devices that are typically used by such individuals and are readily available to them.

SUMMARY OF THE INVENTION

The present invention provides a system and method for automatic translation of broadcast messages in a wireless communication system. With the system and method of the present invention, when a wireless communication device, such as a cellular telephone, enters a region, such as a cell, of a wireless network, the wireless communication device registers with the wireless network by way of a base station and mobile switching center. The registration of the wireless communication device includes the creation of a database entry at the mobile switching center that identifies the wireless communication device and includes an indication of the origin, such as the country code, of the wireless communication device.

Based on this indication of origin, a desired output language may be identified. This identified output language may then be used to identify prestored versions of a broadcast message that are in the output language or identify the mechanism for translating a broadcast message from an original language to the identified output language. In this way, the broadcast message is generated in a language that is most likely to be understood by a user of the wireless communication device.

When a message, either text or audio, is to be broadcast to wireless communication devices in an area of interest, the message and request for broadcast is received by a mobile switching center of a wireless communication network. The mobile switching center stores the message and parameters from the broadcast request in an active broadcast message database for use in broadcasting the message to wireless communication devices in an area of interest.

The mobile switching center then queries registries of wireless communication devices to determine which wireless communication devices are active and within the area of interest of the broadcast message. From the registries, the mobile switching center also identifies the desired output language for the broadcast message for each of the wireless communication devices that are in the area of interest and are active. For each active wireless communication device in the area of interest, the broadcast message is translated into the desired output language and is transmitted to the wireless communication device. Such translation may involve selecting a prestored version of the broadcast message that is in the desired output language, actual translation of the broadcast message into the desired output language, or the like.

In addition to the above, the mobile switching center may periodically query the database of active broadcast messages to determine if a broadcast message should be rebroadcast. If so, the operations above are repeated at periodic intervals so that a broadcast message may be periodically rebroadcast to wireless communication devices in the area of interest.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating the translation and transmission of a broadcast message in accordance with the present invention; and FIG. 4 is a flowchart outlining an exemplary operation of the present invention.

DETAILED DESCRIPTION OF THE PREFERRED EMBODIMENT

The present invention provides a system and method for automatically translating a broadcast message into a more understandable language based on an identification of an origin of a wireless communication device in a wireless communication network. While the present invention will be described, with regard to exemplary embodiments, in terms of a cellular telephone and a cellular network, the present invention is not limited to such. Rather, the present invention may be used with any wireless communication device and any type of wireless communication network. For example, the wireless communication devices may include digital wireless telephones, personal digital assistants, pager devices, portable computing devices, and the like. The wireless communication network may be a digital wireless communication network, such as a PCS network, a satellite based communication network, or the like.

Figure 1:
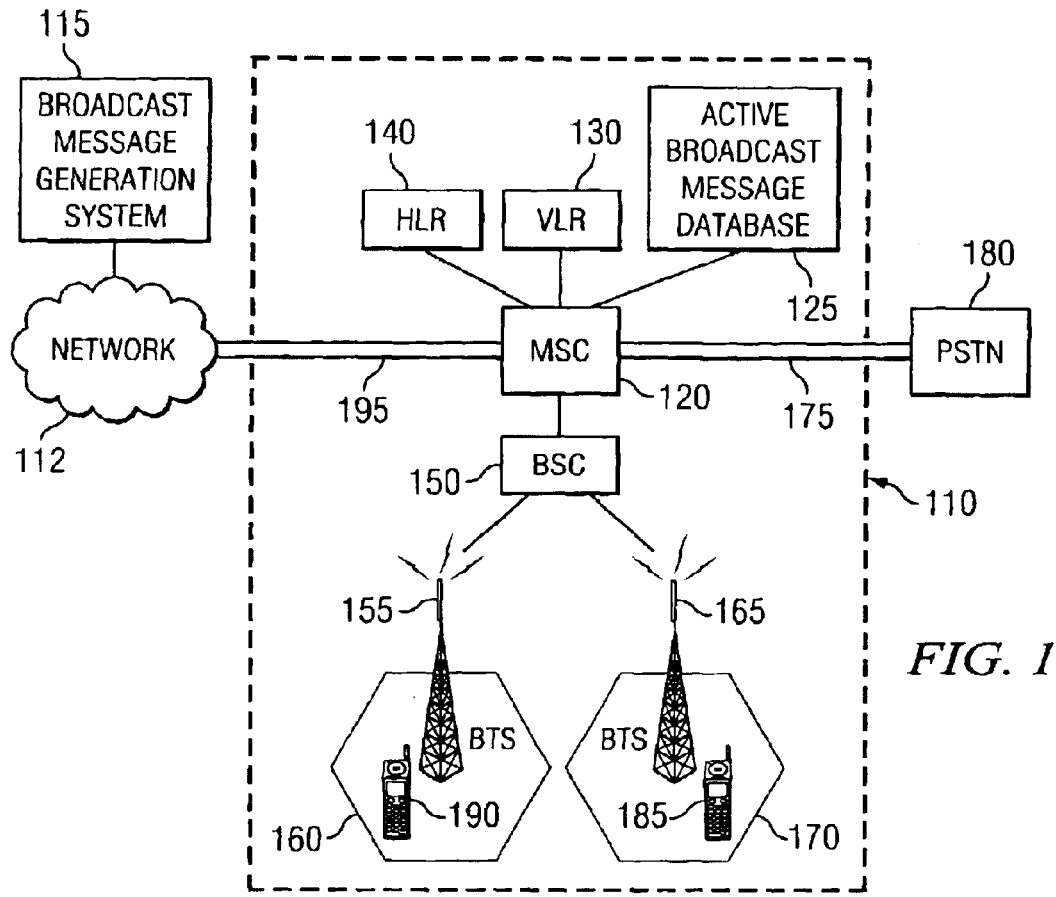
FIG. 1 is an exemplary diagram illustrating a portion of a wireless communication network in accordance with the present invention.

With reference now to the figures, FIG. 1 is an exemplary diagram illustrating a cellular communication system 110 according to the present invention. In FIG. 1 cellular network 110 includes a Mobile Switching Center (MSC) 120 connected to a Visitor Location Register (VLR) 130 and also to a Home Location Register (HLR) 140. A Base Station Controller (BSC) 150 is connected to MSC 120. The BSC 150 is further connected to a Base Transceiver Station (BTS) 155 within a cell 160. A further BTS 165 within a cell 170 is also connected to BSC 150. A voice channel 175 is shown interconnecting public switched telephone network (PSTN) 180 and MSC 120. Within cell 170 there is shown a mobile subscriber (MS) 185. Within cell 160 is another MS 190.

The Visitor Location Register (VLR) 130 is a network entity responsible for storing roaming information related to a mobile subscriber. The roaming information includes information related to the identity of the mobile subscriber as well as address information to be used for contacting the roaming mobile subscriber.

The Home Location Register (HLR) 140 is a network entity responsible for storing subscription information related to mobile subscribers for which the cellular network 110 is the mobile subscriber's home network. Such information may include, for example, identities of the mobile subscribers, address information for use when calling the mobile subscribers, call forwarding information, and the like.

The Base Transceiver Stations (BTS) 155 and 165 send and receive cellular communications to and from the mobile subscribers 185 and 190. The Base Station Controller (BSC) 150 routes cellular communications to the appropriate cell 160 or 170, based on routing information supplied by the Mobile Switching Center (MSC) 120, and coordinates communications between BTSs (e.g., handoff between BTSs). The MSC 120 provides cellular communication services based on information obtained from the HLR 140 and VLR 130 of the cellular network 110. The MSC 120 provides routing information to the BSC 150 for use in routing the cellular communication to an appropriate cell in which the receiving mobile subscriber is located. The BSC 150 is a base station controller which coordinates calls between BTSs 155 and 165 (e.g., handoff between BTSs).

The MSC 120, VLR 130 and HLR 140 entities may or may not be co-located, i.e. within the same computing system or device. If they are not co-located, the MSC 120 is responsible for transferring information to and from the VLR 130 and HLR 140 whenever applicable.

In addition to the above, the cellular network 110 may be connected to other cellular networks and data networks via a wired or wireless connection 195. In the example illustrated in FIG. 1, the cellular network 110 is connected to a data network 112 via the wired or wireless connection 195. Coupled to the data network 112 is a broadcast message generation system 115 that generates broadcast messages to be sent to wireless communication devices via the cellular network 110.

While FIG. 1 illustrates only a single broadcast message generation system 115, in actuality there may be a plurality of broadcast message generation systems 115 that all generate messages to be broadcast to wireless communication devices via the cellular network 112. Moreover, while only two cells are illustrated in FIG. 1, the present invention is not limited to such and any number of cells may be included in the cellular network 110 without departing from the spirit and scope of the present invention.

As mentioned previously, the present invention provides a system and method for automatic translation of broadcast messages in a wireless communication network, such as cellular communication network 110. With the system and method of the present invention, when a wireless communication device, such as a cellular telephone 190, enters a region, such as a cell 160, of a wireless communication network 100, the wireless communication device 190 registers with a mobile switching center 120 of the wireless communication network 100 by way of a base transceiver station 155 and base station controller 150.

The registration of the wireless communication device includes the creation of a database entry in one of the home location register 140 or the visitor location register 130 associated with the mobile switching center 120 that identifies the wireless communication device 190 and includes an indication of the origin, such as the country code, of the wireless communication device 190.

If the wireless communication device 190 is located in its home wireless communication network, then the database entry is created in the home location register 140. If the wireless communication device 190 is a visitor to the wireless communication network, i.e. the wireless communication network is not its home wireless communication network, then the database entry is created in the visitor location register 130.

The indication of origin in the exemplary embodiments described herein is a country code, which may be obtained from an address, such as a telephone number, associated with the wireless communication device. The country code identifies the origin of the user of the wireless communication device 190. While the country code is utilized in the preferred embodiments, the present invention is not limited to such and any identification of origin of the user of the wireless communication device 190 may be used without departing from the spirit and scope of the present invention. For example, the user may set a profile in the wireless communication device 190 in which the user identifies a country to be his/her origin. Any identifier of this country may be used with the present invention. Alternatively, the user may select a particular language to be used with messages in the user's profile in the wireless communication device 190.

Based on the identification of origin, which may be a country code, a designation of an output language to be used, or the like, the present invention performs translation of broadcast messages sent to the wireless communication device 190 into a language that is more readily understandable to a person that originates from the identified country or uses the identified language. Such translation may be performed for either text or audio messages.

When the broadcast message generation system 115 generates a message to be broadcast to wireless communication devices, such as cellular telephones 185 and 190, the broadcast message generation system 115 provides the message to the MSC 120 via the data network 112 and the communication link 195. The message may be provided in a request for broadcast sent to the MSC 120 which may include other parameters designating the frequency, i.e. how often the message is to be sent out, of the broadcast, the area of interest, and other parameters used to control the dissemination of the message to wireless communication devices. In addition, the broadcast request may include various versions of the message which may be broadcast, such as versions in different languages or different versions that are to be broadcast with each retransmission of the broadcast message.

The MSC 120 stores the message(s) and their broadcast request parameters in an active broadcast message database 125 for use by the MSC 120 in broadcasting the message(s) to the wireless communication devices. Upon receipt of the broadcast request, or at predetermined intervals designated by the broadcast request parameters, the message(s) stored in the active broadcast message database 125 are broadcast to a plurality of wireless communication devices that are active in the cellular network 110. The particular wireless communication devices to which the message is broadcast is determined based on whether or not the wireless communication device is currently located within an area of interest specified in the broadcast request.

The MSC 120 determines which wireless communication devices are within an area of interest by querying one or more registries in which active wireless communication devices register upon performing a handshake operation with the base transceiver stations 155 and 165, for example. In the depicted example, these registries are the home location registry 140 and the visitor location registry 130. As part of this handshake operation, the base station controller 150 or MSC 120 may request location information from the wireless communication devices or otherwise determine the location of the wireless communication devices. For example, the wireless communication device may be equipped with a global positioning sensor that allows the wireless communication device to know its location on the surface of the Earth and be able to report this location back to the BSC 150 or MSC 120. Alternatively, any known or later developed mechanism for determining the location of the wireless communication device may be used. For example, the round trip delay or signal strength may be used to determine a location of the wireless communication device in relation to a base transceiver station.

This location information of the wireless communication devices is updated periodically in the registries for use with the present invention in determining which wireless communication devices should receive a broadcast message. That is, the area of interest indicated in the broadcast request is compared to the current location of the wireless communication devices to determine whether they are in the area of interest for a particular broadcast message. If they are in the area of interest, the parameters in the registry indicating the output language for the broadcast message are read to identify the manner by which the broadcast message is to be translated. These parameters may include, for example, a country code associated with the wireless communication device, a selection of the desired output language by the user of the wireless communication device, or the like.

In a preferred embodiment, the identification of the origin of the wireless communication device is performed based on a country code associated with the wireless communication device. A lookup table may be supplied that allows a country code to be matched with an appropriate output language. For example, the country code for the United States would be mapped to English using such a table. Similarly, the country code for Mexico may be mapped to Spanish.

This designation of country code as an identifier of an appropriate output language may be extended to particular regions within a country based on area or territory codes. For example, some countries, such as Canada, have regions that speak English and others that speak French. Depending on the territory, either English or French may be the predominate language and thus, a designator of the territory in addition to the country code may be used to differentiate between appropriate output languages for countries in which multiple languages are present and dominant.

Based on the identification of the appropriate output language for the broadcast message, the MSC translates the broadcast message into an appropriate output language before transmitting the message to the wireless communication device. This translation may involve selecting a prestored version of the message that is in the appropriate output language, actual translation of the message into the appropriate output language, or the like. For example, if the message is a text message, then a known text translation mechanism may be used to convert the text from a first language to a second language. If the message is an audio message, a voice recognition mechanism may be used to convert the audio message into a text equivalent, the text may then be translated into the appropriate output language, and the text may then be converted to an audio message using a known voice synthesis mechanism.

The operations discussed above may be performed for each wireless communication device to which the broadcast message is to be sent. While the above exemplary embodiments describe the operations as being primarily performed by the MSC 120, the present invention is not limited to such. Rather, those operations performed by the MSC 120 may be distributed to one or more other separate devices that perform these functions under the control of the MSC 120.

As an example of the types of messages contemplated by the present invention, consider the sending of weather warning messages. For example, a weather safety administration may determine that a tornado watch should be in affect for a designated geographical area because of weather conditions in that area. As a result, the weather safety administration may generate a message that is to be broadcast to persons in the designated area. The present invention may be used to disseminate the warning message to persons in the designated area by way of their cellular telephones.

With the present invention, the message would be sent to the MSC in a broadcast request. The MSC would then determine which cellular telephones are currently active and in the designated area. The MSC would then determine the appropriate language in which the message should be output to each of the active cellular telephones in the designated area. The MSC may then output the message in the various languages to each of the active cellular telephones in the designated area. In this way, even if the user of a cellular telephone were from a foreign country, the user is provided with a warning message in a language that is most likely understandable by the user. In this way, the user may be warned of imminent danger and be able to take appropriate precautions.

Figure 2:
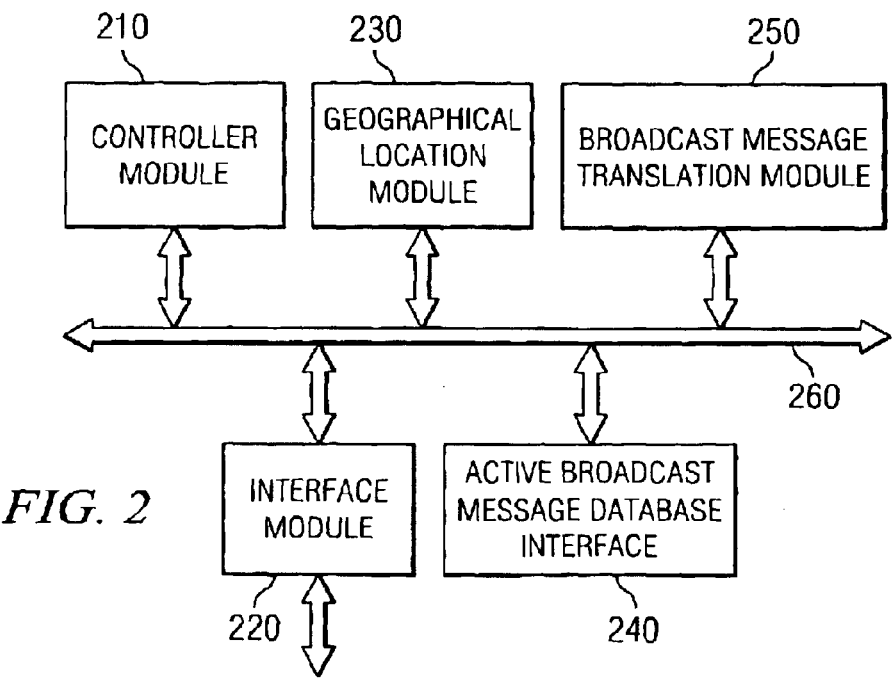
FIG. 2 is a block diagram of the primary operation components of an automated broadcast message translation mechanism according to the present invention.

FIG. 2 is an exemplary block diagram of the primary operational components of the present invention. The elements shown in FIG. 2 may be implemented as software, hardware, or any combination of software and hardware without departing from the spirit and scope of the present invention. In a preferred embodiment, the elements of FIG. 2 are implemented as software instructions executed by one or more processors. The broadcast message translation apparatus shown in FIG. 2 may be incorporated into a MSC, for example, or may be provided in one or more separate devices coupled to an MSC.

As shown in FIG. 2, the broadcast message translation apparatus of the present invention includes a controller module 210, an interface module 220, a geographical location module 230, an active broadcast message database interface 240, and a broadcast message translation module 250. The elements 210–250 are in communication with one another via the control/data signal bus 260. Although a bus architecture is shown in FIG. 2, the present invention is not limited to such and any architecture that facilitates the communication of control/data signals between the elements 210–250 may be used without departing from the spirit and scope of the present invention.

The controller module 210 controls the overall operation of the apparatus and orchestrates the operation of the other elements 220–250. The interface module 220 provides an input/output interface to the MSC through which broadcast messages and broadcast requests are received and messages are output to the wireless communication devices.

When a broadcast request is received, and periodically at a regular interval, the controller 210 instructs the geographical location module to perform a check of the current locations of registered wireless communication devices for active broadcast messages in the active broadcast message database. In response, the geographical location module 230 performs a check of the current location of the wireless communication devices registered in the registries associated with the MSC against the area of interest indicated in the broadcast request of a broadcast message in the active broadcast message database. The information regarding the active broadcast messages may be obtained from the active broadcast message database via the active broadcast message database interface 240.

Based on a determination that a wireless communication device is present in the area of interest for the broadcast message, the controller 210 instructs the broadcast message translation module 250 to determine the proper translation for the broadcast message and to generate the translated message for output to the wireless communication device.

The broadcast translation module 250 determines the appropriate output language for the broadcast message based on an identifier of origin in the registry entry for the wireless communication devices in the area of interest of the broadcast message. In a preferred embodiment, the identifier of origin is a country code in the address, e.g., a telephone number, associated with the wireless communication device. The country code may be mapped to a language that is the predominant language for the country corresponding to the country code. Thus, for example, a country code corresponding to the United States may be mapped to an English output language. Alternatively, or in addition, a registry entry may include a user designation of an output language. This user designation of an output language may supercede using the country code as an identifier of an appropriate output language.

Once the appropriate output language is identified, the broadcast message translation module 250 then translates the broadcast message from its original language into the desired output language. This translation may be an actual translation of the words in the message stored in the active broadcast message database or may be a selection of a prestored version of the broadcast message stored in the active broadcast message database, for example.

Once translated, the translated broadcast message is provided to the MSC via the interface module 220 for transmission to the wireless communication device. This process may be repeated for each wireless communication device determined to be within the area of interest of the broadcast message. Furthermore, this process may be repeated at regular intervals until it is determined that the broadcast message has expired, e.g., by determining that the current time is outside the range of active times for the broadcast message.

FIG. 3 is an exemplary diagram illustrating a data flow for an example message translation in accordance with the present invention. As shown in FIG. 3, a message source 310 provides a broadcast message to the MSC 300. The MSC 300, after having stored the broadcast message and its broadcast parameters, searches the registries, such as VLR 380 and HLR 390, for active wireless devices (320). For each active wireless device 370 identified, the MSC 300 determines whether the wireless device 370 is in the area of interest where the message is to be broadcast (330).

For each wireless device determined to be within the area of interest, an appropriate output language is determined (340). In a preferred embodiment, the output language is determined based on a country code associated with the wireless device. This country code may be present, for example, in a registry entry, such as a VLR or HLR registry entry, associated with the wireless device. Alternatively, a designation of the appropriate output language may be provided in such a registry entry for use in determining the output language to which messages are to be translated.

Once the appropriate output languages are determined, a version of the broadcast message is generated for each appropriate output language (350). That is, the original broadcast message is translated into the appropriate output language for each active wireless communication device in the area of interest. The translated messages are then transmitted to the wireless devices (360).

FIG. 4 is a flowchart outlining an exemplary operation of the present invention. As shown in FIG. 4, the operation starts with receipt of a message to be broadcast to wireless devices (step 410). A search of associated registries is performed in order to identify active wireless devices (step 420). A determination is made as to whether the identified active wireless devices are within an area of interest for the broadcast message (step 430). Then for each active wireless device that is within the area of interest, an appropriate output language is identified (step 440). As previously described, in a preferred embodiment, the determination of the appropriate output language is based on a country code in a registry entry associated with the wireless device. Alternatively, a designation of an output language may be provided in the registry entry and may be utilized to determine the appropriate output language.

A version of the broadcast message is then generated in the appropriate language for each active wireless device in the area of interest (step 450). The generated messages are then transmitted to the wireless devices (step 460). This operation may be repeated periodically at predetermined time intervals.

Thus, the present invention provides an automated system and method for translating broadcast messages in a wireless communication network. With the system and method of the present invention, the user of a wireless communication device is provided with messages in a language that is most likely to be understood by the user. Moreover, the functions of the present invention may be integrated into a wireless communication network and a wireless communication device that is already associated with the user thereby eliminating the need for the user to purchase or otherwise manipulate a device separate from his/her wireless communication device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, in addition to sending the translated message to the wireless communication device, the original message may also be sent to the wireless communication device. In such an embodiment, the translated message may be displayed our otherwise output to the user of the wireless communication device while the untranslated version of the message is stored for backup purposes under the assumption that either the user has sufficient knowledge of the original language of the message or may solicit the help of another person who understands the original language of the message to thereby translate the message for the user.

Other modifications to the embodiments described herein may be made without departing from the spirit and scope of the present invention. The embodiments described herein were chosen and described in order to best explain the principles of the invention, the practical application, and to enable others of ordinary skill in the art to understand the invention for various embodiments with various modifications as are suited to the particular use contemplated.

What is claimed is:

1. A method of automatically translating a message to be routed to a wireless communication device via a wireless communication network, comprising:
    receiving a request to send a first message to wireless communication devices in a designated area of interest;
    determining if the wireless communication device is within the area of interest;
    determining an output language for the first message if the wireless communication device is determined to be within the area of interest;
    generating a second message that is a version of the first message in the determined output language; and
    outputting the second message to the wireless communication device.

2. The method of claim 1, wherein determining an output language for the first message includes querying at least one registry for an entry corresponding to the wireless communication device, and wherein the entry includes an identification of the output language.

3. The method of claim 2, wherein the identification of the output language is a country code associated with the wireless communication device.

4. The method of claim 1, wherein determining it the wireless communication device is within the area of interest includes comparing a current location of the wireless communication device to an identification of the area of interest in the request.

5. The method of claim 4, wherein the current location of the wireless communication device is determined from one of a global positioning system measurements, round trip delay measurements, and signal strength measurements.

6. The method of claim 1, wherein the message is one of a text message and an audio message.

7. The method of claim 1, wherein generating a second message includes selecting one of a plurality of versions of the first message, wherein each version in the plurality of versions of the first message is in a different language.

8. The method of claim 1, wherein the first message is a warning message issued by a governmental entity.

9. The method of claim 1, wherein the area of interest is a geographical region to which the first message is applicable.

10. The method of claim 1, further comprising:
    storing the first message along with one or more parameters from the request in a database of active messages, wherein the one or more parameters includes an identification of how often the first message is to be sent to wireless communication devices in the area of interest.

11. A computer program product in a computer readable medium for automatically translating a message to be routed to a wireless communication device via a wireless communication network, comprising:
    first instructions for receiving a request to send a first message to wireless communication devices in a designated area of interest;
    second instructions for determining if the wireless communication device is within the area of interest;
    third instructions for determining an output language for the first message it the wireless communication device is determined to be within the area of interest;
    fourth instructions for generating a second message that is a version of the first message in the determined output language; and
    fifth instructions for outputting the second message to the wireless communication device.

12. The computer program product of claim 11, wherein the third instructions for determining an output language for the first message include instructions for querying at least one registry for an entry corresponding to the wireless communication device, and wherein the entry includes an identification of the output language.

13. The computer program product of claim 12, wherein the identification of the output language is a country code associated with the wireless communication device.

14. The computer program product of claim 11, wherein the second instructions for determining if the wireless communication device is within the area of interest include instructions for comparing a current location of the wireless communication device to an identification of the area of interest in the request.

15. The computer program product of claim 11, wherein the message is one of a text message and an audio message.

16. The computer program product of claim 11, wherein the fourth instructions for generating a second message include instructions for selecting one of a plurality of versions of the first message, wherein each version in the plurality of versions of the first message is in a different language.

17. The computer program product of claim 11, wherein the first message is a warning message issued by a governmental entity.

18. The computer program product of claim 11, wherein the area of interest is a geographical region to which the first message is applicable.

19. The computer program product of claim 11, further comprising:

sixth instructions for storing the first message along with one or more parameters from the request in a database of active messages, wherein the one or more parameters includes an identification of how often the first message is to be sent to wireless communication devices in the area of interest.

20. An apparatus for automatically translating a message to be routed to a wireless communication device via a wireless communication network, comprising:

means for receiving a request to send a first message to wireless communication devices in a designated area of interest;

means for determining if the wireless communication device is within the area of interest;

means for determining an output language for the first message if the wireless communication device is determined to be within the area of interest;

means for generating a second message that is a version of the first message in the determined output language; and means for outputting the second message to the wireless communication device.

* * * * *